US010731719B2

(12) United States Patent
Crippa et al.

(10) Patent No.: US 10,731,719 B2
(45) Date of Patent: Aug. 4, 2020

(54) PAD ASSEMBLY FOR CALIPER BODY

(71) Applicant: FRENI BREMBO S.P.A., Curno, Bergamo (IT)

(72) Inventors: Cristian Crippa, Curno (IT); Massimo Raffaeli, Curno (IT); Andrea Milanesi, Curno (IT); Mirko Castellana, Curno (IT); Daniel Longhi, Curno (IT)

(73) Assignee: Freni Brembo, S.p.A., Curno, Bergamo (IT)

( * ) Notice: Subject to any disclaimer, the term of this patent is extended or adjusted under 35 U.S.C. 154(b) by 48 days.

(21) Appl. No.: 16/064,673

(22) PCT Filed: Dec. 20, 2016

(86) PCT No.: PCT/IB2016/057807
§ 371 (c)(1),
(2) Date: Jun. 21, 2018

(87) PCT Pub. No.: WO2017/109684
PCT Pub. Date: Jun. 29, 2017

(65) Prior Publication Data
US 2019/0011003 A1     Jan. 10, 2019

(30) Foreign Application Priority Data
Dec. 23, 2015   (IT) ........................ 102015000087313

(51) Int. Cl.
*F16D 65/097*     (2006.01)
*F16D 55/225*     (2006.01)
(Continued)

(52) U.S. Cl.
CPC ..... *F16D 65/0978* (2013.01); *F16D 65/0006* (2013.01); *F16D 65/0068* (2013.01);
(Continued)

(58) Field of Classification Search
CPC ............... F16D 65/097; F16D 65/0977; F16D 65/0978; F16D 65/0006; F16D 65/092;
(Continued)

(56) References Cited

U.S. PATENT DOCUMENTS 4,124,105 A    11/1978   Maehara
4,219,105 A *   8/1980   Delaunay ............ F16D 65/0977
                                                                                                          188/73.38
(Continued)

FOREIGN PATENT DOCUMENTS

DE          19602888 C1    8/1997
DE          10320605 B3    11/2004
(Continued)

OTHER PUBLICATIONS

European Patent Office, International Search Report with Written Opinion issued in PCT/IP2016/057807), dated Jun. 29, 2017, 13 pages, European Patent Office, Rijswijk, Netherlands.

*Primary Examiner* — Thomas J Williams
(74) *Attorney, Agent, or Firm* — Marshall & Melhorn, LLC

(57) ABSTRACT

A pad assembly adapted to be mounted in a caliper body for a disc brake has a pad-housing pocket. The disc brake defines an axial direction, either coinciding or parallel with the direction of the rotation axis of the brake disc associable with the caliper body, a radial direction (R-R), orthogonal to the axial direction, and a tangential (T-T) or circumferential (T-T) direction, orthogonal both to the axial direction and to the radial direction (R-R). The pad-housing pocket has at least one pocket wall to form a tangential abutment for a brake pad associable with the caliper body. The pad assembly has a brake pad having a support plate, adapted to form a support for at least one associable friction material, where the support plate has a main extension along the radial (R-R) and tangential (T-T) directions. The support plate has a (Continued)

predefined bulk along the tangential direction (T-T), or tangential bulk, such that the support plate is adapted to be accommodated with a predetermined tangential play in the pad-housing pocket. The pad also has at least one elastic element.

10 Claims, 4 Drawing Sheets

(51) Int. Cl.
*F16D 65/00* (2006.01)
*F16D 65/092* (2006.01)
*F16D 55/00* (2006.01)

(52) U.S. Cl.
CPC .......... *F16D 65/092* (2013.01); *F16D 55/225* (2013.01); *F16D 2055/0016* (2013.01); *F16D 2200/0021* (2013.01); *F16D 2250/0084* (2013.01)

(58) Field of Classification Search
CPC ............... F16D 65/0068; F16D 55/225; F16D 2055/0016; F16D 2250/0084; F16D 2200/0021
See application file for complete search history.

(56) References Cited

U.S. PATENT DOCUMENTS

| | | | |
|---|---|---|---|
| 4,699,524 A | 10/1987 | Bath | |
| 9,297,431 B2 * | 3/2016 | Kamiya | ............. F16D 65/0972 |
| 10,082,186 B2 * | 9/2018 | Butz | ................... F16D 65/0976 |
| 2007/0114102 A1 * | 5/2007 | Iraschko | ............... F16D 65/095 |
| | | | 188/73.38 |

FOREIGN PATENT DOCUMENTS

| | | |
|---|---|---|
| EP | 2213900 A1 | 8/2010 |
| WO | 2005064191 A1 | 7/2005 |
| WO | 2005064193 A1 | 7/2005 |

* cited by examiner

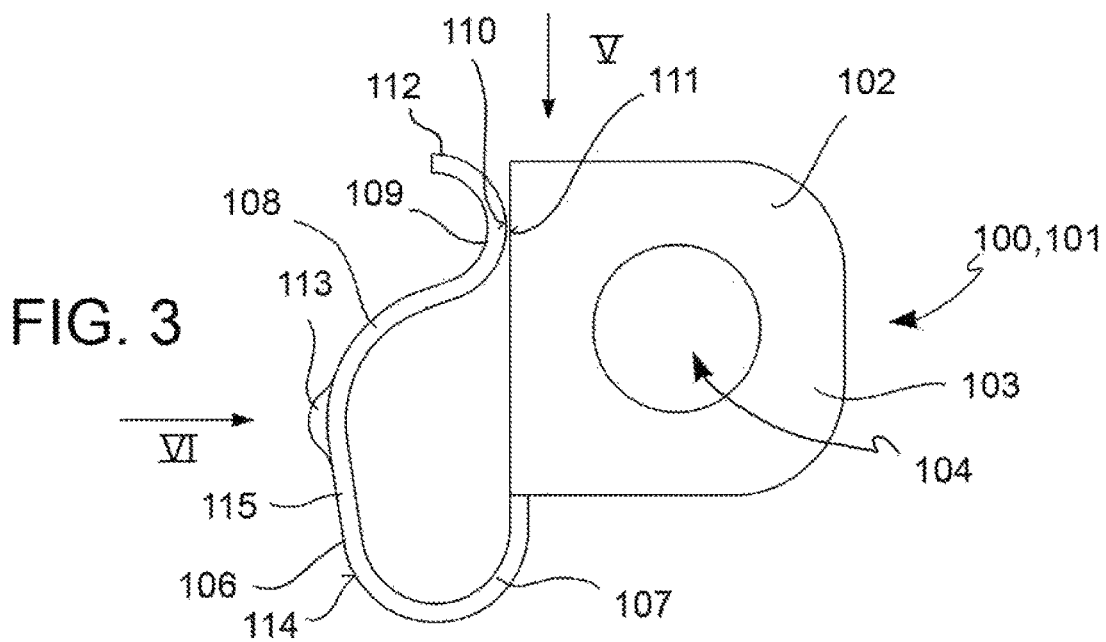
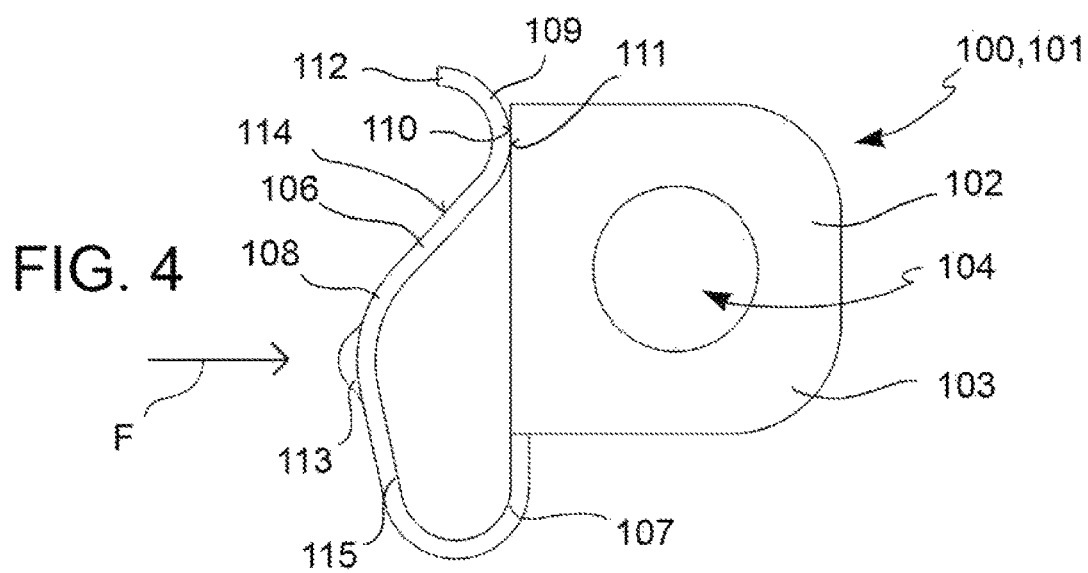
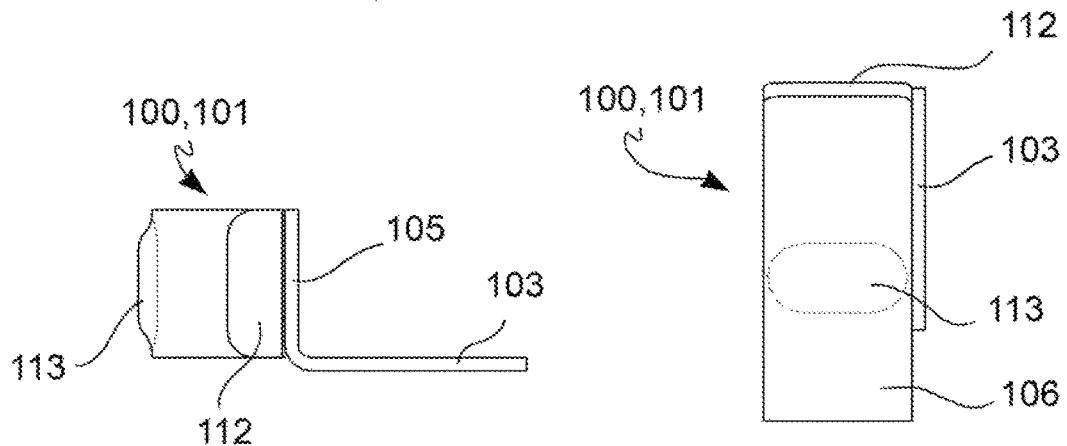

PAD ASSEMBLY FOR CALIPER BODY

FIELD OF THE INVENTION

The present invention relates to a pad assembly for a disc brake caliper.

In particular, the present invention relates to a pad assembly comprising a brake pad and at least one elastic element.

The present invention also relates to an elastic element for brake pads.

The present invention further relates to a caliper comprising said pad assembly, as well as to a method of mounting said pad assembly in a caliper body.

BACKGROUND ART

Brake pads are generally fixed on pins and inserted in specific seats included in the brake caliper body. Said seats are shaped so as to leave mechanical play between seat walls and pad so as to facilitate the operations of assembling and disassembling the brake pad.

However, including said although minimum mechanical play, particularly along a direction tangential to the braking surface of an associable brake disc, or tangential direction, allows the brake pad pressed against the braking surface of the disc to move and accelerate in order to follow the tangential direction. Annoying noise phenomena, such as for example the well-known knocking noise, occur during the braking action, when the pad stops against tangential abutments of its seat.

This problem is amplified while the vehicle is traveling, particularly in the case of high-performance vehicles, when dust and dirt accumulate in the gaps left between pads and pad-housing seat walls. These dust and dirt become compacted, tending to block the brake pad in position during the braking action, which pad requires more tangential force to slide on the braking surface thus resulting in an even louder knocking noise. For example, these known drawbacks occur when, after a given distance on which the vehicle is traveling forwards, it proceeds in reverse and then brakes.

Some known solutions of noise-prevention devices have been suggested with the purpose of providing a brake caliper adapted to provide the quietest braking action possible. For example, document U.S. Pat. No. 4,699,254 shows a blade spring which is mounted between an upper portion of the brake pad and an upper opening of the caliper body, said blade spring is adapted to exert a tangential braking action on a portion of the brake pad. This solution, although partially advantageous, is very cumbersome and rather laborious to mount, because the spring extends towards a dedicated opening provided in the upper portion of the caliper body.

For example, document U.S. Pat. No. 564,961 shows a blade spring adapted to grip, with a "C"-shaped portion thereof, a side extension of the pad, in order to damp the displacements of the brake pad during the braking action. This solution forces side protections on the brake pad, like ears, to achieve the coupling with the spring. Therefore, the pad-housing pocket provided in the caliper body must contain recesses adapted to house said side protections, or ears, of the brake pad.

For example, international patent WO-2005-064193 to the same Applicant shows a type of blade spring adapted to be mounted on the brake caliper body and connected to a side portion of the pad. This solution, although partially advantageous, does not fully solve the problem, because it obliges in all cases to include lock pins fixed in eyelets of the pad so as to limit the tangential displacement of the pad itself during the braking action. Furthermore, the spring shown in this document is difficult to be assembled, disassembled and maintained because it is mounted about a protuberance made in the caliper body. A further example is shown in document WO-2005-064191.

The need is thus felt to provide a spring and a brake pad, as well as a brake caliper, capable of avoiding, or at least limiting, the onset of annoying noisy phenomena during the braking action, without requiring inconvenient and difficult assembly, disassembly and maintenance procedures.

Similarly, the need is felt to provide a brake pad capable of damping the accelerations between brake pad and caliper body which arise during the braking action.

Solution

It is an object of the present invention to suggest a spring, brake pad and brake caliper solution capable of solving the drawbacks of the prior art mentioned above.

It is a further object of the present invention to provide a spring, pad assembly and disc brake caliper solution adapted to ensure quiet braking, and at the same adapted to provide simple assembly, disassembly and maintenance operations.

It is a further particular object of the present invention to provide a pad assembly comprising an elastic element capable of integrating with preexisting brake caliper solutions.

These and other objects are achieved by a pad assembly according to claim 1, by a caliper according to claim 8, by a method according to claim 9, and by an elastic element according to claim 10.

Some advantageous embodiments are the object of the dependent claims.

According to an aspect of the invention, a pad assembly comprising a brake pad and at least one elastic element is adapted to provide an elastic reaction force to the tangential force which is generated between caliper body and brake pad during the braking action.

According to an aspect of the invention, an elastic element for brake pad is adapted to provide elastic reaction to the tangential force which is generated between caliper body and brake pad during the braking action, when it is mounted on a portion of a support plate of a brake pad.

According to an aspect of the invention, a caliper comprising a brake pad assembly is adapted to provide quiet braking in both forward and reverse travel conditions of the vehicle.

According to an aspect of the invention, a method of mounting a brake pad in a caliper body is adapted to provide an integration of the pad assembly comprising at least one elastic element with brake caliper solutions which do not contemplate the inclusion of any elastic element.

DRAWINGS

Further features and advantages of the pad assembly, caliper, method and elastic element according to the invention will become apparent from the description provided below of preferred embodiments thereof, given by way of non-limiting example, with reference to the accompanying drawings, in which:

FIG. 3 shows a spring, according to an embodiment of the invention, in an undeformed configuration;

FIG. 4 shows a spring, according to an embodiment of the invention, in a deformed configuration;

FIG. 5 is a view taken along arrow V in FIG. 3;

FIG. 6 is a view taken along arrow VI in FIG. 3;

DESCRIPTION OF SOME PREFERRED EMBODIMENTS

Figure 1:
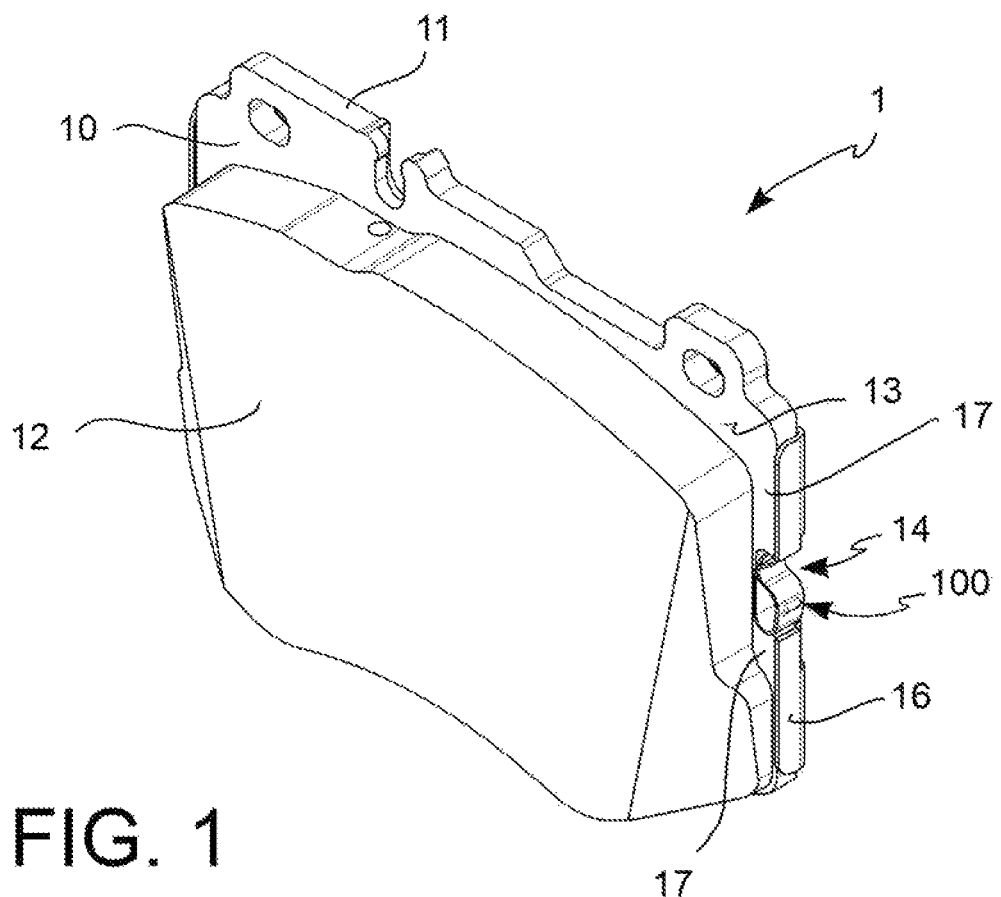
FIG. 1 is an axonometric view of a pad assembly according to an embodiment of the invention.
Figure 2:
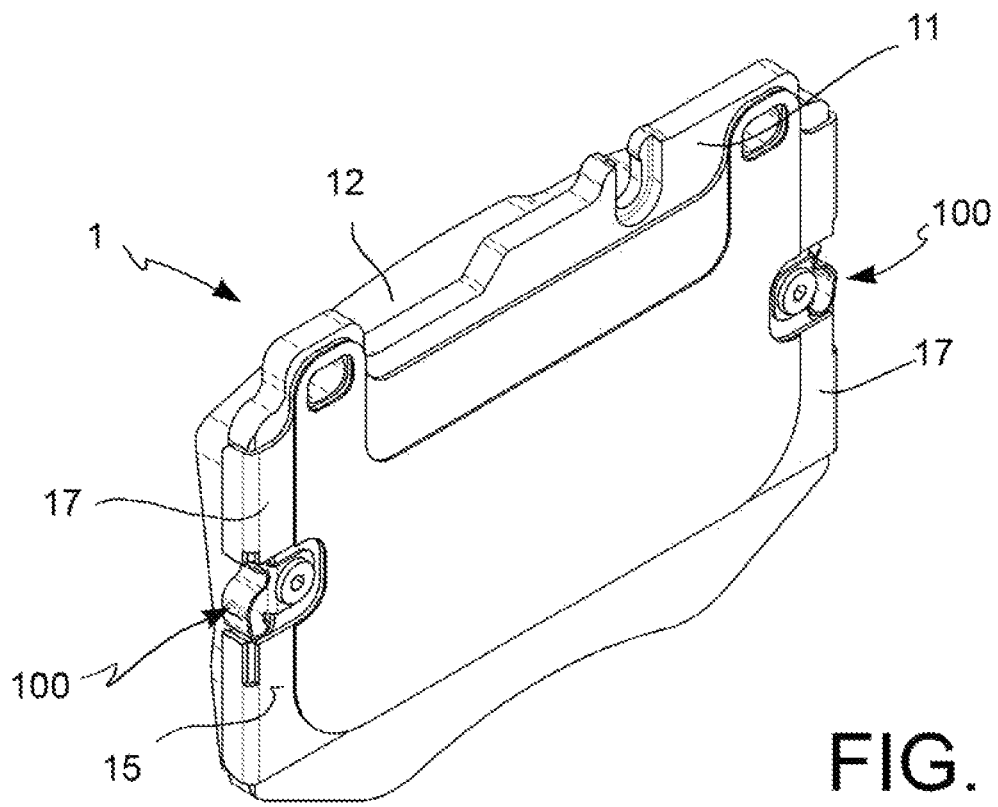
FIG. 2 is an axonometric view of a pad assembly according to an embodiment of the invention.
Figure 7:
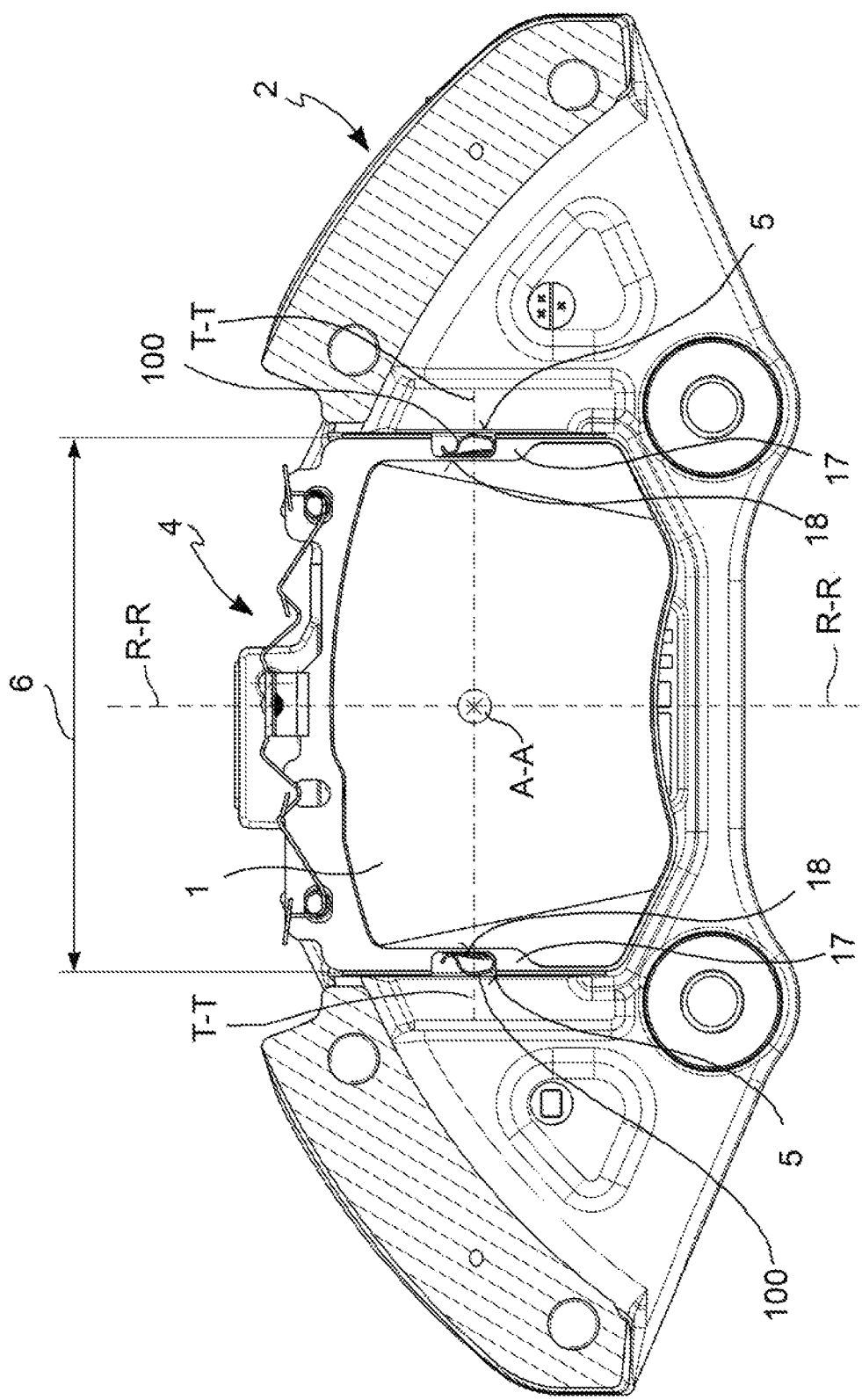
FIG. 7 is a diagrammatic section, taken according to a longitudinal cut, which shows a caliper body comprising a pad assembly according to an embodiment of the invention.
Figure 8:
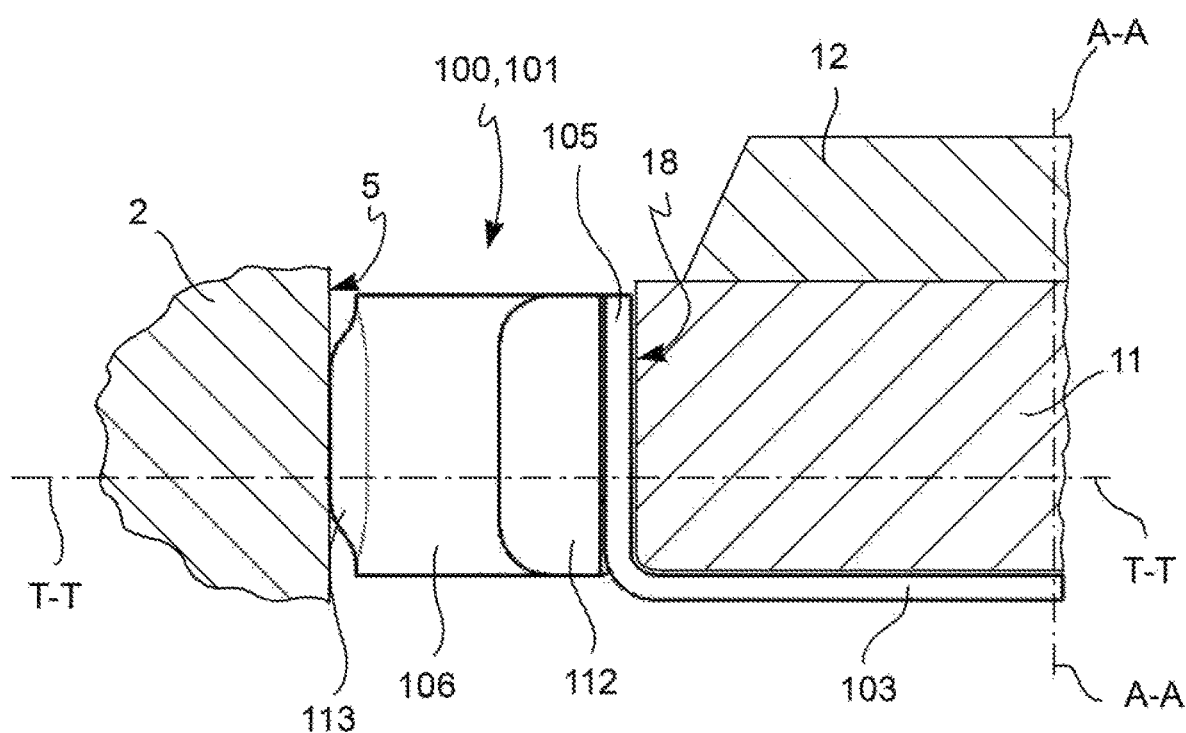
FIG. 8 is a diagrammatic section, made by means of a cut in the plane defined by the tangential and axial directions, which shows a portion of a pad assembly, according to an embodiment, when it is housed in a caliper body.

According to a general embodiment and with reference to the accompanying figures, a pad assembly is indicatively shown with reference numeral 1.

Said pad assembly 1 is adapted to be mounted in a caliper body 2 for a disc brake comprising a pad-housing pocket 4.

Said disc brake defines an axial direction A-A, either coinciding or parallel with the direction of the rotation axis of the brake disc associable with the caliper body 2, a radial direction R-R, orthogonal to the axial direction A-A, and a tangential T-T or circumferential T-T direction, orthogonal both to the axial direction A-A, and to the radial direction R-R.

Said pad-housing pocket 4 has at least one pocket wall 5, adapted to form tangential abutment for a brake pad associable with the caliper body 2.

According to an embodiment, said pad-housing pocket 4 has at least two opposite pocket walls 5, adapted to form tangential abutments for a brake pad associable with the caliper body 2.

Said a brake pad assembly 1 comprises a brake pad 10, comprising a support plate 11, adapted to form a support for at least one associable friction material 12.

Said support plate 11 has main extension along the radial R-R and tangential T-T directions. The support plate 11 has main extension along the radial R-R and tangential T-T directions also when it is not assembled to said caliper body 2.

According to an embodiment, said support plate 11 comprises a first face 13, having extension along the radial R-R and tangential T-T directions, said first face 13 being adapted to form a support for a least one associable friction material 12.

According to an embodiment, said support plate 11 comprises a second face 15, opposite to said first face 13.

Said support plate 11 has a predefined bulk along the tangential direction T-T, or tangential bulk 6, such that said support plate 11 is adapted to be accommodated with a predetermined tangential play in said pad-housing pocket 4.

As known, including said predetermined tangential play allows easy assembly and disassembly operations of the pad assembly 10 in said pad-housing pocket 4 provided in the caliper body 2.

Said pad assembly further comprises at least one elastic element 100.

According to an embodiment, said at least one elastic element 100 is mounted interposed between said support plate 11 and said pocket wall 5, so as to be adapted to provide the brake pad 10 with an elastic reaction directed along the tangential direction T-T.

Advantageously, said at least one elastic element 100 is adapted to provide an elastic reaction to the brake pad 10 directed along the tangential direction T-T, when it is biased.

According to an embodiment, said support plate 11 comprises at least one niche 14, adapted to locally reduce the tangential bulk 6 of said support plate 11.

Including said niche 14 allows the assembly of said at least one elastic element 100 with said support plate 11, so as to make the pad assembly 1 more compatible in size with a pad-housing pocket 4 for which no elastic element was provided. This operation allows to carry out easy retrofitting operations with preexisting brake calipers.

Including said at least one niche 14 is particularly advantageous when the pad-housing pocket 4 has substantially flat pocket walls 5.

According to an embodiment, said at least one niche 14 is adapted to reduce locally the tangential extension of said elastic element 100, mounted on said support plate 11, when said pad assembly 1 is mounted in said pad-housing pocket 4. In other words, the size of said niche 14 is such as to determine a compression of the elastic element 100, when said pad assembly 1 is housed in said pad-housing pocket 4.

According to an embodiment, said support plate 11 comprises at least one side face 16, adapted to face at least one pocket wall 5, when said brake pad 10 is mounted in said brake body 2, and where said at least one niche 14 is obtained on said at least one side face 16.

According to an embodiment, said support plate comprises at least one side portion 17, located at the end of the tangential extension of said support plate 11, and in which said at least one niche 14 is provided in said at least one side portion 17.

According to an embodiment, said at least one elastic element 100 is mounted on said support plate 11 accommodated in said at least one partially projecting niche 14, so as to rest, when said support plate 11 is housed in said pad-housing pocket 4, on the pocket walls 5 of said pad-housing pocket 4 also when no braking action is applied.

According to an embodiment, said at least one elastic element 100 is mounted on said support plate 11 accommodated in said at least one partially projecting niche 14, so as to provide said pad assembly 1 with a tangential preload, when said support plate 11 is housed in said pad-housing pocket 4. Thereby, the tangential preload is provided also in non-braking conditions or not under braking action.

The dimensioning of at least one niche 14 is such as to allow the housing of said at least one elastic element 100 while allowing said at least one elastic element 100 to push against a pocket wall 5, when it is housed in said pad-housing pocket 4, so as to maintain said pad assembly 1 in tangential preload conditions. This allows to perform retrofitting operations easily on brake calipers which did not contemplate the inclusion of any elastic element 100 associated with the brake pedal accommodated in a pad-housing pocket 4, while allowing to maintain said pad assembly 1 in preload conditions. According to an embodiment, said at least one elastic element 100 is mounted only on a side portion 17 so as to provide a preload only on one side of said pad assembly 1 when said support plate 11 is housed in said pad-housing pocket 4. For example, said tangential preload may be provided exclusively when the braking action is applied in forward driving conditions of the vehicle. In other words, said tangential preload may be provided exclusively in one rotation direction of a brake disc associable with the caliper body 2.

According to an embodiment, said at least one elastic element 100 is mounted on said support plate 11 accommodated in said at least one niche 14, so that, when said support plate 11 is housed in said pad-housing pocket 4, said elastic element 100 has a tangential extension such as to at least equal said predetermined tangential extension.

Advantageously, including this feature allows to eliminate said predetermined tangential play between said pad assembly 1 and said pad-housing pocket 4. Thereby, tangential accelerations between brake pad 10 and brake body 2 are damped during the braking action. Therefore, the knocking noise caused by the impact between brake pad 10 and pocket wall 5 is eliminated. According to an embodiment, said at least one elastic element 100 is mounted on said support plate 11 accommodated in said at least one niche 14, so that, when said support plate 11 is housed in said pad-housing pocket 4, said elastic element 100 has a tangential extension greater than the tangential extension defined by said predetermined tangential play. This forces said at least one elastic element to be deformed by pressing against at least one pocket wall 5, during the insertion of said pad assembly 1 in said pad-housing pocket 4.

According to an embodiment, said niche 14 allows said elastic element 100 to exit from said predefined tangential bulk to recover the tangential play and to elastically load said pad.

According to an embodiment, said at least one elastic element 100 comprises a blade spring 101, mainly adapted for flexural work, and shaped so as to provide the pad assembly 1 with an elastic reaction directed along the tangential direction T-T, when said blade spring 101 is bent.

According to an embodiment, said at least one elastic element 100 comprises an anchor portion 102, adapted to form a coupling with a portion of said support plate 11.

According to an embodiment, said anchor portion 102 is shaped so as to form a coupling with a portion of said second face 15 of said support plate 11.

Including said anchor portion 102 allows to prefit the elastic element 100 on the support plate 11, so as to provide said pad assembly 1 outside the caliper body 2.

According to an embodiment, said anchor portion 102 comprises a first anchor body 103, having main extension along the radial R-R and tangential T-T direction, and comprising at least one anchor hole 104 to couple to said second face 15 of said support plate 11 by using fastening means. For example, said fixing means may comprise threaded or non-threaded elements, such as by way of non-limiting example screws, pegs or fixing pins.

According to an embodiment, said at least one side portion 17 of said support plate 11 comprises niche walls, adapted to define said at least one niche 14, and where said niche walls comprise at least one niche face 18, adapted to face at least one pocket wall 5, when the brake pad 10 is mounted in said caliper body 2.

According to an embodiment, said niche face 18 is substantially orthogonal to at least either said first face 13 or said second face 15.

According to an embodiment, said niche face extends along the radial R-R and axial directions.

According to an embodiment, said anchor portion 102 comprises a second anchor body 105, having main extension along the radial R-R and axial direction, and adapted to form an abutment for at least one portion of said niche face 18.

Including said anchor portion 102 comprising said first anchor body 103 and said second anchor body 105 allows to provide an "L"-shaped body which acts as an abutment for at least one side portion of said support plate 11.

According to an embodiment, said anchor portion 102 is made in one piece.

According to an embodiment, said first anchor body 103 and said second anchor body 105 are made separately and then assembled, to form said anchor portion 102.

According to an embodiment, said elastic element 100 comprises at least one blade spring 101 which extends from said anchor portion 102.

According to an embodiment, said blade spring 101 comprises a spring arm 106, mainly adapted for flexural work and adapted to form a curved path so as to impart an elastic reaction to the pad assembly 1 directed along the tangential direction T-T, when said blade spring 101 is bent.

The term "path" of said spring arm 106 means the longitudinal development of said spring arm 106.

According to an embodiment, said spring arm 106 extends from said anchor portion 102.

According to an embodiment, said spring arm 106 is substantially a spring steel strip. In other words, said spring arm 106 is a strip made of spring steel.

According to an embodiment, said spring arm 106 is adapted to form a spring leaf.

According to an embodiment, the path of said spring arm 106 comprises a proximal loop 107, a middle loop 108 and a distal loop 109.

According to an embodiment, traveling along said spring arm 106 from its portion closest to said anchor portion 102, said proximal loop 107 is met first, then said middle loop 108, and then said distal loop 109.

According to an embodiment, distally to said distal loop 109, said spring arm 106 comprises an arm cantilevered portion 112.

According to an embodiment, said blade spring 101 comprises a loading boss 113, which projects from said spring arm 106 facing towards at least one pocket wall 5, said loading boss 113 is adapted to form the contact site with said pocket wall 5 so as to exchange tangential stresses with said caliper body 2.

Including said loading boss 113 provides a safe contact site between caliper body 2 and pad assembly 1.

According to an embodiment, said loading boss 113 receives the tangential force F which is generated during the braking action until the pad settles against the caliper body. In other words, during the braking action, the tangential force F is transmitted to the pad assembly 1 by means of said loading boss 113.

According to an embodiment, said loading boss 113 transmits the elastic reaction due to the deformation of said spring arm 106 to the caliper body 2.

According to an embodiment, said loading boss 113 is made by drawing or punching.

According to an embodiment, said spring arm 106 comprises an arm outer face 114, adapted to face towards said pocket wall 5, when said pad assembly 1 is mounted on said caliper body 2, and where said loading boss 113 is obtained on said arm outer face 114.

According to an embodiment, said proximal loop 107 and said middle loop 108 bend in the same direction and said distal loop 109 bends in opposite direction. In other words, the curvatures of said proximal loop 107 and said medium loop 108 agree along the path of said spring arm 106, while the curvature of said distal loop 109 does not agree with each of said proximal 107 and middle 108 loops.

According to an embodiment, said anchor portion 102 and said spring arm 106 describe a closed path, where a sliding face 110 of said spring arm 106 rests and slides on a mutual sliding face 111 of said anchor portion 102. In other words, said distal loop 109 comprises a sliding face 110, facing towards said second anchor body 105 and adapted to slide over, and rest on, a mutual sliding face 111 of said anchor body 105.

Thereby, the sliding of said sliding face 110 of said spring arm 106 occurs on a surface made of spring steel and not on a surface of the caliper body 2 made of aluminum or magnesium. This implies a higher friction coefficient, both static and dynamic, and therefore dissipates a greater portion of the tangential force F which is generated during the braking action.

Such a spring structure comprising said spring arm 106 which rests on two resting points allows the blade spring 101, during the braking action, to provide a double elastic reaction action to the tangential force F when the tangential force F is applied on said loading boss 113. Furthermore, including such a spring structure capable of providing said double elastic reaction action provides said blade spring 101 with improved yield strength compared to the known spring solution which are not adapted to provide said double elastic reaction action.

By virtue of the synergistic effect of said double elastic action with the aforesaid sliding direction with friction, the pad assembly 1 according to the invention offers improved damping performance of the tangential accelerations between brake pad and caliper body, compared to known solutions.

Therefore, a caliper body comprising said pad assembly 1 can provide silent braking or at least more silent that known solutions.

According to an embodiment, during the braking action, the tangential force F pushes said loading boss 113 towards said anchor position 102 bending said spring arm 106, and causing the sliding of said sliding face 110 on said mutual sliding face 111.

According to an embodiment, during the braking action, the tangential force F causes a deformation of said proximal 107, middle 108 and distal 109 loops.

According to an embodiment, during the braking action, the curvature radius of said proximal loop 107 is decreased. This implies an accumulation of elastic energy in the spring arm 106.

According to an embodiment, the elastic energy accumulated in the spring 106 by virtue of its flexural deformation is released onto the caliper body 2 by means of said loading boss 113.

According to an embodiment, said proximal loop 107 and said middle loop 108 have substantially the same curvature radius.

According to an embodiment, said proximal loop 107 and said middle loop 108 are indistinguishable to form a single loop.

According to an embodiment, the path of said spring arm 106 comprises at least one rectilinear portion 115. For example, said at least one rectilinear portion 115 may be arranged between said proximal loop 107 and said middle loop 108. Additionally or alternatively, said at least one rectilinear portion 115 may be arranged between said middle loop 108 and said distal loop 109. Additionally or alternatively, said at least one rectilinear portion 115 may be arranged between said anchor loop 102 and said proximal loop 109.

According to a variant embodiment, said proximal loop 107 and said middle loop 108 bend in opposite directions. In other words, they form a substantially "S"-shaped path.

According to an embodiment, said spring arm anchor portion 106 and said anchor portion 102 are made in one piece.

According to an embodiment, said spring arm 106, said first anchor body 103 and said second anchor body 105 are made in at least two separate pieces which are then assembled.

According to an embodiment, said support plate 11 comprises at least two niches 14, located on opposite sides of said support plate 11 and adapted to face opposite pocket walls 5, so that said pad assembly 1 is adapted to house at least two elastic elements 100, at least one for each of said opposite sides of the support plate 11. In other words, said support plate 11 comprises at least two niches 14 obtained on opposite side portions 17 of said support plate 11 and adapted to face opposite pocket walls 5, so that said pad assembly 1 is adapted to house at least two elastic elements 100, at least one for each of said at least two side portions 17 of the support plate 11.

According to an embodiment, said pad assembly 1 comprises at least two elastic elements 100, located on opposite side portions of said support plate 11, so as to be adapted to provide a tangential preload, by resting on opposite walls of the pocket 5 of said pad-housing pocket 4.

According to an embodiment, said pad assembly 1 comprises at least two elastic elements 100, located on opposite side portions of said support plate 11, so as to be adapted to provide an elastic reaction directed along the tangential direction T-T, when biased. Including this feature makes said pad assembly 1 adapted to eliminate said predetermined tangential play on both opposite sides of said supporting plate 11. Furthermore, this allows to eliminate the knocking noise when the vehicle is traveling either forwards or backwards. In other words, the onset of noise of a brake associable with said caliper body 2 is thus prevented in both rotation directions.

Furthermore, including at least two elastic elements 100, one for each side portion 17 of said support plate 11, allows said pad assembly 1 to self-center when it is mounted in said pocket 4 of said caliper body 2. In other words, the centering of the pad assembly 1 in its seat is thus ensured.

According to an embodiment, said support plate 11 is substantially symmetric with respect to a symmetric plane parallel to the radial direction R-R.

According to an embodiment, said brake pad 10 comprises at least one friction material 12 on the first face 13 of said support plate 11, where said friction material 12 is adapted to face a braking surface of a brake disc associable with the caliper body 2.

According to a general embodiment, an elastic element 100 for brake pads is adapted to be mounted in a niche 14 provided in a brake pad 10, and is made according to any one of the embodiments described above.

According to a general embodiment, a disc brake body 2, where said disc brake 3 defines an axial direction, either coinciding or parallel with the direction of the rotation axis of the brake disc associable with the caliper body 2, a radial direction R-R, orthogonal to the axial direction, and a tangential T-T or circumferential T-T direction, orthogonal both to the axial direction, and to the radial direction R-R, comprises at least one pad-housing pocket 4, said pad-housing pocket 4 having at least one pocket wall 5 to form a tangential abutment for a brake pad associable with the caliper body 2, and at least one pad assembly 1 according to any one of the embodiments described above.

The method of assembling said pad assembly 1 in a caliper body 2 will be described below.

A method for mounting said pad assembly 1 in a caliper body 2 comprises the following steps:

(A) providing a pad assembly 1 according to any one of the embodiments described above;

(B) assembling said pad assembly 1, such that said at least one elastic element 100 is coupled to said support plate 11;

(C) inserting said pad assembly 1 in a pad-housing pocket 4 of said caliper body 2.

For example, said caliper body 2 is a caliper body 2 which was not made to accommodate said at least one elastic element 100, but was made to accommodate only the brake pad 10.

According to a possible operation mode, said method comprises, before step (A), the step of removing a brake pad from the caliper body 2 which does not comprise any elastic element.

This allows to perform retrofitting operations.

Those skilled in the art may make many changes and adaptations to the embodiments described above or may replace elements with others which are functionally equivalent in order to satisfy contingent needs without however departing from the scope of the appended claims.

LIST OF REFERENCES

1 Pad assembly
2 Caliper body
4 Pad-housing pocket
5 Pocket wall
6 Tangential bulk of said support plate
10 Brake pad
11 Support plate
12 Friction material
13 First face of support plate
14 Niche
15 Second face of support plate
16 Side face
17 Side portion
18 Niche wall
100 Elastic element
101 Blade spring
102 Anchor portion
103 First anchor body
104 Hole
105 Second anchor body
106 Spring arm
107 Proximal loop
108 Middle loop
109 Distal loop
110 Sliding face
111 Mutual sliding face
112 Arm cantilevered portion
113 Loading boss
114 Arm outer face
115 Rectilinear portion
A-A Axial direction
R-R Radial direction
T-T Tangential or circumferential direction

The invention claimed is:

1. A pad assembly, suitable for being mounted in a caliper body for a disc brake comprising a pad-housing pocket, wherein said disc brake defines an axial direction (A-A), coinciding or parallel with the direction of the rotation axis of the brake disc that can be associated with the caliper body, a radial direction (R-R), orthogonal to the axial direction (A-A), and a tangential (T-T) or circumferential (T-T) direction, orthogonal both to the axial direction (A-A), and to the radial direction (R-R), said pad-housing pocket having at least one pocket wall to form tangential abutment for a brake pad that can be associated with the caliper body;

said pad assembly comprising:
said brake pad, comprising a support plate, suitable for forming a support for at least one associable friction material,
wherein said support plate has main extension along the radial (R-R) and tangential (T-T) direction,
said support plate having a predefined bulk along the tangential direction (T-T), or tangential bulk, such that said support plate is suitable for being accommodated with a predetermined tangential play in said pad-housing pocket,
at least one elastic element, suitable for being mounted interposed between said support plate and said pocket wall, so as to be suitable for providing the brake pad with an elastic reaction directed along the tangential direction (T-T);
wherein said support plate comprises at least one niche, suitable for locally reducing the tangential bulk of said support plate;
and wherein said at least one elastic element is mounted on said support plate accommodated in said at least one niche,
partially projecting, such as, when said support plate is housed in said pad-housing pocket, to rest on said at least one pocket wall of said pad-housing pocket also when no braking action is exerted;
wherein said at least one elastic element comprises an anchor portion and one blade spring, said one blade spring comprises a spring arm, wherein said anchor portion is suitable for forming a coupling with a portion of said support plate, wherein said anchor portion and said spring arm describe a closed path, wherein a sliding face of said spring arm rests and slides on a mutual sliding face of said anchor portion.

2. The pad assembly, according to claim 1, wherein said support plate comprises at least one side portion, located at the end of the tangential extension of said support plate, and wherein said at least one niche is made in said at least one side portion; and/or wherein
said at least one elastic element is mounted on said support plate accommodated in said at least one niche, partially projecting, such as, when said support plate is housed in said pad-housing pocket, to provide said pad assembly with a tangential preload;
said niche allows said elastic element to exit said predefined tangential bulk; and/or wherein
said elastic element has a tangential extension equal to the tangential extension defined by said predetermined tangential play; and/or wherein
said elastic element has a tangential extension greater than the tangential extension defined by said predetermined tangential play; and/or wherein
said niche allows said elastic element to exit said predefined tangential bulk to recover the tangential play and to elastically load said pad.

3. The pad assembly, according to claim 1, wherein said one blade spring is mainly suitable for flexural work and shaped such as to provide the pad assembly with an elastic reaction directed along the tangential direction (T-T), when said blade spring is bent.

4. The pad assembly, according to claim 1, wherein said anchor portion is shaped such as to form a coupling with a portion of said second face of said support plate; and/or wherein said anchor portion comprises a first anchor body, having main extension along the radial (R-R) and tangential (T-T) direction, and comprising at least one anchor hole to couple to said second face of said support plate by using fastening means; and/or wherein said at least one side portion of said support plate comprises niche walls, suitable for defining said at least one niche, and wherein said niche walls comprise at least one niche face, suitable for facing at least one pocket wall, when the brake pad is mounted in said caliper body; and/or wherein said niche face is substantially orthogonal to at least one of said first face and said second face; and/or wherein said niche face is extended along the radial (R-R) and axial direction; and/or wherein said anchor portion comprises a second anchor body, having main extension along the radial (R-R) and axial direction, and suitable for forming an abutment for at least one portion of said niche face; and/or wherein said anchor portion is made in a single piece; and/or wherein said first anchor body and said second anchor body are made separately and then assembled, to form said anchor portion.

5. The pad assembly, according to claim 1, wherein said elastic element comprises at least one leaf spring which is extended from said anchor portion; and/or wherein said spring arm is mainly suitable for flexural work and suitable for forming a curved path such as to provide the pad assembly with an elastic reaction directed along the tangential direction (T-T), when said blade spring is bent; and/or wherein said spring arm is extended from said anchor portion; and/or wherein said spring arm is substantially a strip of spring steel; and/or wherein said spring arm is suitable for forming a leaf spring; and/or wherein the path of said spring arm comprises a proximal loop, a middle loop and a distal loop; and/or wherein traveling along said spring arm from its portion closest to said anchor portion, said proximal loop is met first, then said middle loop, and then said distal loop; and/or wherein distally to said distal loop, said spring arm comprises an arm cantilevered portion.

6. The pad assembly, according to claim 5, wherein said blade spring comprises a loading boss, which projects from said spring arm facing at least one pocket wall, said loading boss is suitable for forming the contact site with said pocket wall so as to exchange tangential stresses with said caliper body; and/or wherein said loading boss receives the tangential force (F) which is generated during the braking action until the pad settles against the caliper body; and/or wherein said loading boss transmits the elastic reaction due to the deformation of said spring arm to the caliper body; and/or wherein said spring arm comprises an arm outer face, suitable for facing said pocket wall, when said pad assembly is mounted on said caliper body, and wherein said loading boss is obtained on said arm outer face; and/or wherein said distal loop comprises a sliding face, facing said second anchor body and suitable for sliding over, and resting on, a mutual sliding face of said anchor body; and/or wherein said spring arm and said anchor portion are made in a single piece; and/or wherein said spring arm, said first anchor body and said second anchor body are made in at least two separate pieces which are then assembled.

7. The pad assembly, according to claim 1, wherein said support plate comprises at least two niches, located on opposite sides of said support plate and suitable for facing opposite pocket walls, such that said pad assembly is suitable for housing at least two elastic elements, at least one for each of said opposite sides of the support plate; and/or wherein said support plate comprises at least two niches obtained on opposite side portions of said support plate and suitable for facing opposite pocket walls, such that said pad assembly is suitable for housing at least two elastic elements, at least one for each of said at least two side portions of the support plate; and/or wherein said pad assembly comprises at least two elastic elements, located on opposite side portions of said support plate, so as to be suitable for providing a tangential preload, resting on opposite walls of the pocket of said pad-housing pocket; and/or wherein said pad assembly comprises at least two elastic elements, located on opposite side portions of said support plate, so as to be suitable for providing an elastic reaction directed along the tangential direction (T-T), when biased.

8. A disc brake caliper comprising a caliper body for a disc brake, wherein said disc brake defines an axial direction (A-A), coinciding or parallel with the direction of the rotation axis of the brake disc that can be associated with the caliper body, a radial direction (R-R), orthogonal to the axial direction (A-A), and a tangential (T-T) or circumferential (T-T) direction, orthogonal both to the axial direction (A-A), and to the radial direction (R-R), said caliper body comprising at least one pad-housing pocket, said pad-housing pocket having at least one pocket wall forming a tangential abutment for a brake pad that can be associated with the caliper body, and at least one pad assembly;

at least one elastic element comprising an anchor portion and one blade spring, said one blade spring comprises a spring arm, wherein said anchor portion is suitable for forming a coupling with a portion of a support plate, wherein said anchor portion and said spring arm describe a closed path, wherein a sliding face of said spring arm rests and slides on a mutual sliding face of said anchor portion;

wherein said brake pad comprises said support plate that supports at least one associable friction material, wherein said support plate has main extensions along the radial (R-R) and tangential (T-T) directions, said support plate having a predefined bulk along the tangential direction (T-T), or tangential bulk, such that said support plate has a predetermined tangential play in said pad-housing pocket, wherein said at least one elastic element is mounted between said support plate and said pocket wall, so as to provide the brake pad with an elastic reaction directed along the tangential direction (T-T);

wherein said support plate comprises at least one niche, for locally reducing the tangential bulk of said support plate;

and wherein said at least one elastic element is mounted on said support plate in said at least one niche.

9. A method for mounting a pad assembly in a caliper body comprises the following steps:

(A) providing a pad assembly;
(B) assembling said pad assembly, such that at least one elastic element is coupled to a support plate;
(C) inserting said pad assembly in a pad-housing pocket of a caliper body;
wherein said at least one elastic element comprises an anchor portion and one blade spring, said one blade spring comprises a spring arm, wherein said anchor portion is suitable for forming a coupling with a portion of said support plate, wherein said anchor portion and said spring arm describe a closed path, wherein a sliding face of said spring arm rests and slides on a mutual sliding face of said anchor portion;
(D) providing a brake pad comprising a support plate for a support for at least one associable friction material,
wherein said support plate has main extensions along the radial (R-R) and tangential (T-T) directions,
said support plate having a predefined bulk along the tangential direction (T-T), or tangential bulk, such that said support plate has a predetermined tangential play in said pad-housing pocket,
wherein said at least one elastic element is mounted between said support plate and a pocket wall, so as to provide the brake pad with an elastic reaction directed along the tangential direction (T-T);
wherein said support plate comprises at least one niche, for locally reducing the tangential bulk of said support plate;
and wherein said at least one elastic element is mounted on said support plate in said at least one niche.

10. An elastic element for a brake pad, mounted in a niche provided in said brake pad, comprising at least one blade spring which is extended from an anchor portion; and/or wherein
said blade spring comprises a spring arm, mainly suitable for flexural work and suitable for forming a curved path so as to impart a pad assembly an elastic reaction directed along the tangential direction (T-T), when said blade spring is bent,
wherein said anchor portion is suitable for forming a coupling with a portion of a support plate, wherein said anchor portion and said spring arm describe a closed path, wherein a sliding face of said spring arm rests and slides on a mutual sliding face of said anchor portion;
wherein said spring arm comprises a loading boss projecting from an arm outer face of said spring arm.

* * * * *